Oct. 27, 1953   H. GOLDMAN   2,657,123
FUEL STRAINER AND ATOMIZER FOR
INTERNAL-COMBUSTION ENGINES
Filed Jan. 19, 1951   2 Sheets-Sheet 2
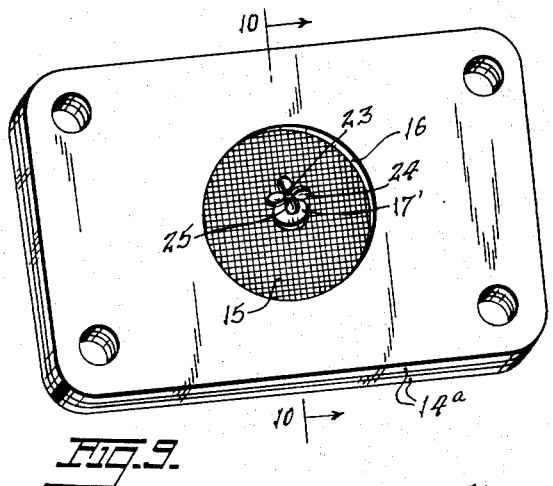
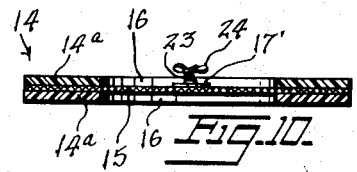
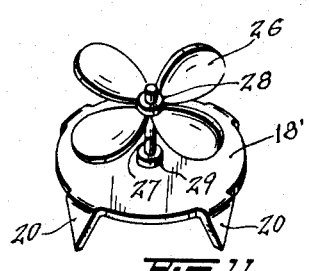
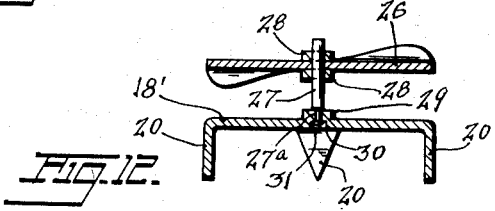
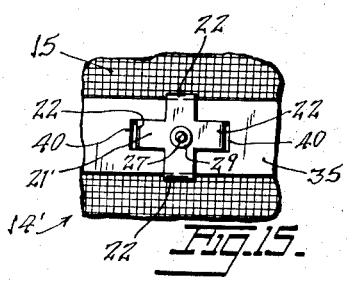
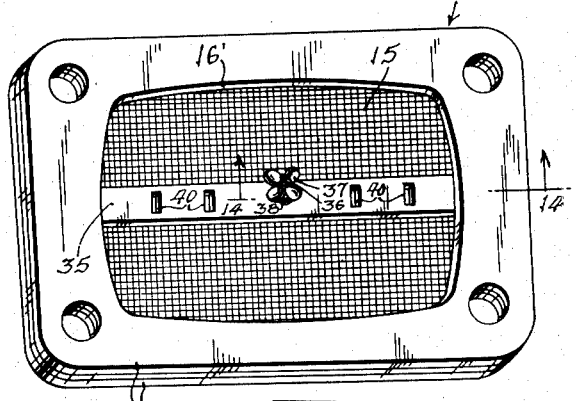
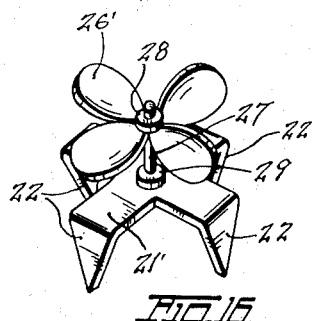
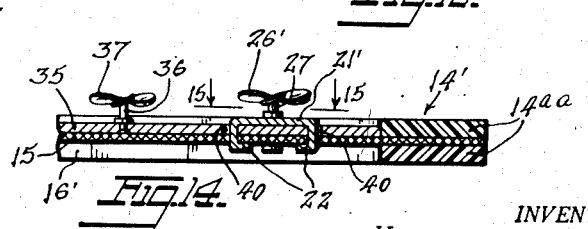
INVENTOR.
HAROLD GOLDMAN
BY
ATTORNEY Patented Oct. 27, 1953

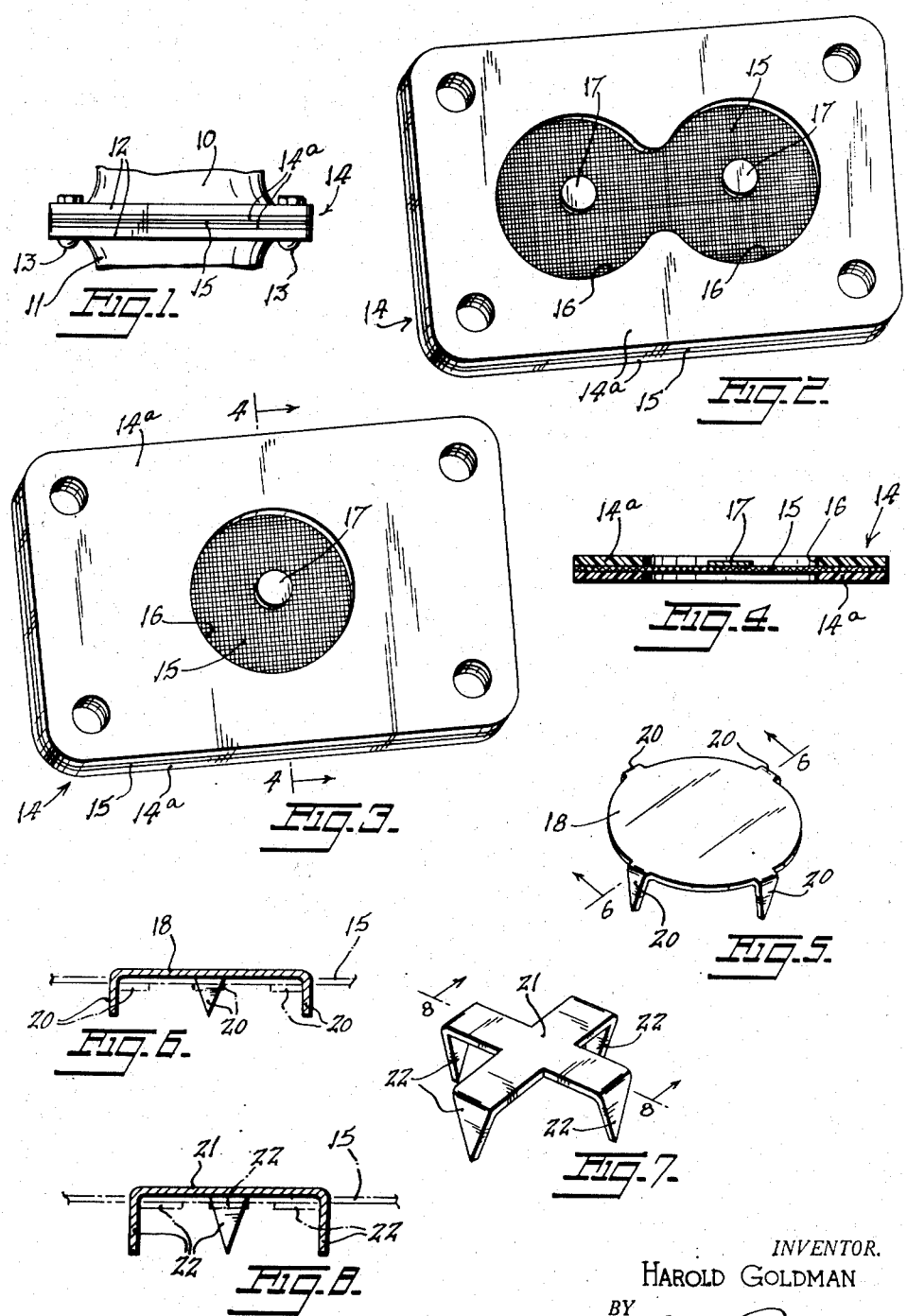

2,657,123

UNITED STATES PATENT OFFICE 2,657,123

FUEL STRAINER AND ATOMIZER FOR INTERNAL-COMBUSTION ENGINES

Harold Goldman, New York, N. Y.

Application January 19, 1951, Serial No. 206,775

5 Claims. (Cl. 48—180)

1

This invention relates to new and useful improvements in fuel atomizers for internal combustion engines.

In internal combustion engines it is customary to place a filter screen between the carburetor and the intake manifold so that fuel sprayed from the carburetor passes through the screen on entering the manifold. It has been found, however, that such screens are not completely effective to prevent a centrally disposed jet of fuel from entering the manifold in a liquid stream, which, of course, hampers starting of the engine and causes the formation of carbon.

One object of the invention is the provision of a filter screen having baffling means to prevent the passage of bulk fuel and particles of dirt into the intake manifold, and to prevent coagulation of the fuel.

Another object of the invention is to construct the improved filter in such manner that the same is readily mounted between a carburetor and the associated intake manifold.

Another object of the invention is to construct the filter in such manner that the baffle is readily removed therefrom for replacement by another of a more desirous size or shape.

Still another object of the invention is to construct the filter in such manner that the same is capable of being constructed in an economical manner.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary elevational view illustrating the connection between a carburetor and an intake manifold.

Fig. 2 is a perspective view of a dual form of the invention utilized with dual carburetors.

Fig. 3 is a perspective view of the form of the invention utilized with single carburetors.

Fig. 4 is a sectional view on line 4—4 of Fig. 3.

Fig. 5 is a perspective view of a modified type of baffle plate for the means of the invention.

Fig. 6 is a sectional view on line 6—6 of Fig. 5.

Fig. 7 is a perspective view of another modified form of baffle plate.

Fig. 8 is a sectional view on line 8—8 of Fig. 7.

Fig. 9 is a perspective view similar to Fig. 3, but illustrating a further modification of the present invention.

2

Fig. 10 is a sectional view taken on the line 10—10 of Fig. 9.

Fig. 11 is a perspective view similar to Fig. 5 but illustrating the baffle plate constructed in accordance with another modification of the present invention.

Fig. 12 is a vertical sectional view of Fig. 11.

Fig. 13 is another perspective view similar to Fig. 3, but illustrating still another modification of the present invention.

Fig. 14 is a partial longitudinal sectional view taken on the line 14—14 of Fig. 13, but with one of the auxiliary propellers in position.

Fig. 15 is a partial horizontal sectional view taken on the line 15—15 of Fig. 14.

Fig. 16 is a perspective view of one of the auxiliary propellers used in the form of the invention shown in Figs. 13 to 15.

Referring to Fig. 1, the usual connection is shown between a carburetor 10 and an intake manifold 11 by means of opposed flanges 12 thereon which are secured together by bolts 13 with a gasket 14 therebetween.

According to the invention the gasket 14 is made in two layers 14$^a$ of a synthetic resin or plastic material and between which a fine mesh wire screen 15 is cemented. The layers 14$^a$ have aligned substantially circular openings 16 through which fuel is sprayed from the carburetor, see Figs. 3 and 4. For instances in which the carburator 10 is of the dual type, each layer 14$^a$ of the gasket 14 is provided with a pair of interconnected openings 16 as shown in Fig. 2. Secured by welding or the like to the screen 15 in the center of the opening 16 adjacent carburetor 10 is a small circular baffle plate 17. Of course, where interconnected openings 16 are provided for a dual carburetor, a baffle plate 17 is provided at the center of each opening.

The construction is such that as the fuel is sprayed from carburetor 10 the central portion of the jet which is almost a solid liquid stream is forced against baffle plate 17. This prevents said almost solid stream from passing through screen 15 and entering manifold 11 as such and reduces the formation of carbon. Rather, the fuel stream is broken up by plate 17 and enters the manifold in fine particles in the desired manner.

Referring now to Figs. 5 and 6, there is illustrated a modified form of baffle plate which includes a circular plate 18 from which four diametrally opposed pointed ears or teeth 20 project at right angles to the surface of the plate. As indicated in Fig. 6 the teeth 20 can be projected through the screen 15 and folded back under the plate to secure the latter in place in the desired position on the screen. With this arrangement the baffle plate is readily movable to the most effective position and is readily replaceable by another plate of a more appropriate size.

Referring to Figs. 7 and 8 there is also illustrated another form of baffle plate which is in the form of a short metal cross 21 having a pointed ear or tooth 22 bent off from the end of each arm thereof. This form of baffle plate also is readily movable to the desired position or replaceable and is particularly effective in instances wherein the fuel spray from carburetor 10 is wide and heavily liquid.

In the modification of the invention shown in Figs. 9 and 10, the formation of the gasket 14 is similar to that described in connection with Figs. 3 and 4. The circular baffle plate 17' is welded or otherwise secured to the screen 15 and has a short stud shaft 23 integral therewith and extended concentrically upward therefrom. Rotatively supported on the top end of the stud shaft 23, there is a propeller 24. The shaft 23 has a reduced top end portion and the propeller is rotatively retained in position on that reduced top end portion by a collar 25, see Fig. 9.

The gasket 14 is mounted in the intake pipe so that the propeller 24 projects into the manifold side of the intake pipe. Suction in the manifold which draws the air-gas mixture from the carburetor into the manifold, will cause the propeller 24 to rotate creating a turbulence within the intake pipe and cause the air and gas to be more thoroughly mixed before the mixture is fed into the cylinders of the internal combustion engine.

In other respects the form of the invention shown in Figs. 9 and 10 is similar to that described in connection with Figs. 3 and 4 and like reference numerals are used to identify like parts.

The modified baffle plate shown in Figs. 11 and 12 is similar to that described in connection with Figs. 5 and 6 and is characterized by a circular plate 18' provided at its top surface with a propeller 26. The propeller 26 is freely rotatively supported on the top end of a short stud shaft 27 by means of a pair of spaced collars 28 fixedly secured to the top end of the shaft 27. As shown in Fig. 12, the adjacent faces of the collars 28 are spaced a distance slightly greater than the thickness of the material of which the propeller 26 is formed so that the propeller is free to rotate at all times.

The stud shaft 27 has a reduced bottom portion 27ª, see Fig. 12, which is extended through a boss 29 formed concentrically on the top face of the circular plate 18'. The bottom end of the reduced bottom portion 27ª is milled over forming an enlargement 30 retaining the shaft 27 in position on the circular plate 18'. As shown in Fig. 12, the enlargement 30 is preferably located with a recess 31 in the bottom face of the plate 18' so that the enlargement will in no way interfere with the seating of the bottom face of the plate upon the top face of the screen when the circular plate is mounted in position on the gasket of the intake pipe.

In other respects the form of the invention shown in Figs. 11 and 12 is similar to that described in connection with Figs. 5 and 6 and like reference numerals are used to identify like parts.

The modified gasket 14' of the modified form of the invention shown in Figs. 13 to 16, is comprised of superimposed layers 14ªª of synthetic resin or plastic material which have a fine mesh wire screen 15 cemented in position between the adjacent faces of the layers 14ªª. The layers 14ªª are formed with aligned substantially oval-shaped openings 16', shown most clearly in Fig. 13.

Welded to the top face of the screen 15, there is an elongated metal strip which forms a baffle plate 35 extended across the respective opening 16' completely from one side to the other thereof. Extended upward from the metal strip 35 intermediate of its ends, there is a short stud shaft 36 upon the top end of which a small propeller 37 is rotatively mounted. The stud shaft 36 has a reduced top portion and the propeller 37 is rotatively retained in position by a small collar 38, as shown in Fig. 13. The gasket 14' is mounted in the intake pipe with the propeller 37 extended into the manifold side thereof to rotate and create a turbulence in the intake pipe and cause a more even mixture of the air and before it enters the cylinders of the internal combustion engine.

Means is provided for mounting one or more auxiliary propellers 26' upon the strip 35 on opposite sides of the propeller 37. One of the auxiliary propeller assemblies is shown in perspective in Fig. 16 wherein the propeller 26' is mounted on a cross-shaped plate 21', similar to that described in connection with Figs. 7 and 8, and wherein each of the cross arms of the cross-shaped plate is formed at its free end with a depending pointed tooth 22. The rotative mounting of the propeller 26' upon the cross-shaped plate 21' is similar to that described in connection with Figs. 11 and 12 and similar parts are identified by the same reference numerals.

The baffle plate 35 on opposite sides of the propeller 37 has sets of spaced slots 40. In mounting the auxiliary propeller assemblies in position, one pair of oppositely disposed pointed teeth 22 is engaged through the slots 40, see Figs. 14 and 15 and pressed through the screen 15 and bent over beneath the bottom face of the screen. The other pair of oppositely disposed pointed teeth of the cross-shaped plate 21' then depend along the sides of the baffle plate 35 to be pressed through the screen 15 and bent over against the bottom face of the screen 15. Thus, it is apparent that additional propellers may be mounted on the baffle plate 35 whenever it is desired to create greater turbulence within the intake pipe to more thoroughly mix the air and gas before it enters the cylinder of the engine.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A fuel atomizer gasket for mounting between the carburetor and the intake manifold of an internal combustion engine, comprising superimposed gasket layers having aligned openings therein, a fine mesh wire flat screen cemented between said layers, and a baffle plate secured to said screen within the opening of one of said layers and being substantially smaller than the opening, said openings being substantially oval-shaped in plan, said baffle plate comprising an elongated metal strip secured to one face of said screen within one of said oval-shaped openings, and a propeller rotatively mounted on said elongated baffle plate intermediate of its ends, and means for mounting auxiliary propeller assemblies on said elongated baffle plate on opposite sides of said first-mentioned propeller, said means comprising cross-shaped plates mounting said auxiliary propellers, pairs of spaced slots formed in said elongated baffle plate on opposite sides of said first-mentioned propeller, and pointed teeth depending from the ends of the arms of said cross-shaped plates, one pair of oppositely disposed teeth being passed through said slots to be pressed through the screen while the other pair of oppositely disposed teeth depend along the sides of the elongated baffle plate to be pressed through said screen after which the free ends of all teeth are to be bent over against the face of the screen.

2. A fuel atomizer gasket for mounting between the carburator and the intake manifold of an internal combustion engine, comprising a superimposed gasket layer having aligned openings therein, a fine mesh wire screen cemented between said layers, an elongated metal strip baffle plate secured to one face of the screen, slots in said baffle plate, and a propeller deflector secured on said baffle plate, said securing means comprising a plate retaining said propeller thereon and prongs depending from the edge of said plate, one pair of prongs extending through said slots and the other pair of prongs extending through said screen to secure said deflector on said gasket.

3. The combination of claim 2 wherein said slots are in spaced parallel relation and are perpendicular to the elongated length of the baffle plate.

4. The combination of claim 2 wherein said plate is circular in shape.

5. The combination of claim 2, wherein said plate is cross-shaped.

HAROLD GOLDMAN.

References Cited in the file of this patent

UNITED STATES PATENTS

| Number | Name | Date |
|---|---|---|
| 1,311,071 | Hunter | July 22, 1919 |
| 1,422,916 | Betts | July 18, 1922 |
| 1,462,750 | Hart | July 24, 1923 |
| 1,509,718 | Depotie | Sept. 23, 1924 |